United States Patent [19]

Paulkovich et al.

[11] 4,245,286
[45] Jan. 13, 1981

[54] BUCK/BOOST REGULATOR

[75] Inventors: John Paulkovich, Lanham; G. Ernest Rodriguez, Silver Spring, both of Md.

[73] Assignee: The United States of America as represented by the Administrator of the National Aeronautics and Space Administration, Washington, D.C.

[21] Appl. No.: 41,164

[22] Filed: May 21, 1979

[51] Int. Cl.³ .......................................... H02M 3/335
[52] U.S. Cl. ..................................... 363/21; 363/101
[58] Field of Search ..................... 323/45; 363/101, 21

[56] References Cited

U.S. PATENT DOCUMENTS

| | | | |
|---|---|---|---|
| 3,381,202 | 4/1968 | Loucks et al. | 363/21 |
| 3,559,031 | 1/1971 | Vigna | 363/101 X |
| 3,596,172 | 7/1971 | Harrison | 323/45 |
| 3,913,000 | 10/1975 | Cardwell, Jr. | 363/101 X |
| 3,935,526 | 1/1976 | Kamata et al. | 363/21 |
| 3,984,799 | 10/1976 | Fletcher et al. | 363/21 |
| 4,063,307 | 12/1977 | Stephens | 363/21 |
| 4,163,278 | 7/1979 | Onoue et al. | 363/101 |

Primary Examiner—William M. Shoop
Attorney, Agent, or Firm—Ronald F. Sandler; John R. Manning; John O. Tresansky

[57] ABSTRACT

A voltage regulated DC to DC converter is disclosed which is operable over a wide range of input voltage including voltages greater or less than the desired output voltage. The converter uses an inductor and a capacitor as storage elements, the inductor being composed of two windings having a common junction. A transformer having a center tap connected to the common junction of the two windings of the inductor is connected at either end of its winding to ground through controlled switches. One winding of the inductor and either end of the transformer winding are connected by respective power diodes to the capacitor which supplies the output voltage to a load. The other winding of the inductor is connected to a fourth power diode as a clamping diode. Input voltage is supplied to the inductor through a third controlled switch. A pulse width modulator connected to the output of the converter alternately closes and opens the switches connected to either end of the transformer winding and also closes the switch supplying input voltage to the inductor each time either of the switches connected to the ends of the transformer winding are closed. The duty cycle of the closing and opening of the several switches is adjusted by the pulse modulator to regulate the output voltage.

8 Claims, 10 Drawing Figures

BUCK/BOOST REGULATOR

ORIGIN OF THE INVENTION

The invention described herein was made by employees of the U.S. government and may be manufactured and used by or for the government for governmental purposes without the payment of any royalties thereon or therefor.

BACKGROUND OF THE INVENTION

The present invention generally relates to DC to DC converters and more particularly to a buck/boost pulse width modulated regulator which is operable to provide a desired output voltage over a wide range of input voltage including voltages greater than or less than the desired output voltage.

Regulated DC to DC converters utilizing pulse width modulation have taken several configurations in the prior art. The general requirements for such converters are for high efficiency, small converter size and weight, good output voltage regulation, small output ripple, and the capacity to withstand wide load variations. Additional requirements are often dictated by the specific application of the converter. Perhaps the next severe requirements imposed on such converters are those dictated by space applications as, for example, in a communications or meteorological satellite. In such applications, the input power supply voltage is supplied by batteries which are charged by solar cell arrays. Since the solar cell arrays are periodically shaded by the earth, the state of charge of the batteries and hence the input voltage varies widely. Because of the wide variation in input voltage, the DC to DC converter in this particular application must be capable of providing both buck and boost in order to provide a continuously regulated output voltage of the desired value.

One previous approach was to provide either a buck followed by a boost or a boost followed by a buck. In either case, the boost circuit comprised a center tapped transformer winding the ends of which were connected to ground through controlled switches. The ends of the transformer winding were also connected by power diodes to an inductor and a capacitor which acted as storage elements. The voltage across the capacitor was supplied to a pulse width modulator to alternately open and close the switches connected to the ends of the transformer winding. Input voltage to the boost circuit was supplied to the center tap of the transformer winding. The buck circuit included another inductor supplied with an input voltage via a third controlled switch. This inductor supplied voltage to another capacitor, and the voltage across this capacitor was sensed by a second pulse width modulator which controlled the opening and closing of the third switch.

There are several disadvantages associated with this approach whether implemented as a buck followed by a boost or a boost followed by a buck. First of all, two pulse width modulators are required, one for the boost circuit and one for the buck circuit. This, of course, complicates the circuit with an attendant lowering of both reliability and efficiency. Second, separate inductors and capacitors are required in each of the buck and boost circuits which greatly adds to the bulk and weight of the converter. Third, considerable care must be exercised in the design of the boost circuit to prevent the simultaneous conduction (overlap) of the controlled switches connecting the ends of the transformer winding to ground. In addition to these disadvantages, high ripple currents in more than one capacitor are produced, and the maximum voltage of the switches connected to the ends of the transformer winding and the boost circuit is twice the input voltage.

Another approach was to provide an energy storage boost followed by a buck or vice versa. In either case, the energy storage boost circuit comprised an inductor connected in series with a power diode between positive input and output terminals. An energy storage capacitor was connected across the output terminals, and a controlled switch was connected between the junction of the inductor and the power diode and ground. A pulse width modulator was connected across the output of the capacitor and controlled the opening and closing of the switch. The buck circuit included a controlled switch connected in series with an inductor between positive input and output terminals with a capacitor connected across the output. A power diode was connected between the junction of the controlled switch and the inductor and ground. A second pulse width modulator was connected across the capacitor and controlled the opening and closing of the switch supplying the inductor of the buck circuit. Again, there are several disadvantages to this approach. First, two pulse width modulators are required. Second, additional inductors and capacitors are required. Third, high ripple currents are produced in more than one capacitor.

Another approach was to use a phase controlled buck/boost configuration. This arrangement has some similarities to the first described circuit except that the pulse width modulators are replaced by oscillators. A free running oscillator controls the switches which are connected to either end of the transformer winding in the boost circuit. A single inductor and capacitor are used as storage elements for both buck and boost, and the power diodes connected to either end of the transformer winding are connected by third and fourth controlled switches to the inductor. A phase controlled oscillator is connected across the output capacitor to control the opening and closing of the third and fourth switches.

While the phase controlled buck/boost approach does have the advantage of eliminating one of the inductors and capacitors, two oscillators are still required to control the several switches. Care must be exercised in design of this type of circuit to prevent the simultaneous conduction (overlap) of the switches connected to either end of te transformer winding. Moreover, these switches operate at twice the input voltage.

There has been yet another approach to providing both buck and boost in a DC to DC converter which results in considerable simplification over any of the circuits described thus far. This approach may be characterized as the energy storage approach and is typically implemented with a transformer having a primary winding connected in series with a controlled switch across a source of input voltage. The secondary winding of the transformer is connected by a power diode to charge a storage capacitor connected across the output of the converter. A pulse width modulator is connected across the capacitor and controls the switch in series with the primary winding to provide a regulated output voltage. While very appealing in its simplicity, this approach has some significant disadvantages including high ripple currents at the output of the converter and high peak currents through the controlled switch in series with the primary of the transformer. In addition, this switch operates at greater than the input voltage.

Not only is it desirable in a space application, such as a satellite power supply, to simplify the circuitry for reasons of bulk and weight limitations, but it is vitally important that both the efficiency and the reliability of the circuit be as high as possible. Obviously, increased efficiency leads to lower power source requirements and substantially less heat dissipation. Since the controlled switches of the DC to DC converters are typically switching transistors, lowering of the maximum voltages across these transistors and the maximum current through them will result in improved reliability of the power supply.

SUMMARY OF THE INVENTION

It is therefore an object of the present invention to provide a buck/boost regulator operable over a wide range of input voltage including voltages greater or less than the desired output voltage.

Another object of the invention is to provide a voltage regulated buck/boost DC to DC converter which exhibits improved efficiency over prior art buck/boost regulators.

A further object of the invention is to provide a voltage regulated buck/boost DC to DC converter which exhibits improved reliability over prior art buck/boost regulators.

Yet another object of the invention is to provide a voltage regulated buck/boost DC to DC converter which exhibits low voltage and current output ripple characteristics.

Still another object of the invention is to provide a voltage regulated buck/boost DC to DC converter which exhibits characteristics of simplicity and light weightedness.

According to the present invention, the foregoing and other objects are attained by providing circuitry where a first switch is connected between a power source and energy storage elements. The energy storage elements are, in turn, connected to the output. A single regulator, including a second switch, is connected to the output and senses the output voltage. In response thereto, the second switch controls the operation of the first switch. The circuit configuration provides that the first switch operates at a voltage essentially no greater than the input voltage and the second switch operate at a voltage essentially no greater than the output voltage. The result is a regulator which has good efficiency and ripple characteristics and very good reliability compared to conventional regulators where the switches are subjected to twice the input or output voltages.

BRIEF DESCRIPTION OF THE DRAWINGS

The foregoing and other objects, advantages and aspects of the invention will be better appreciated from the following detailed description with reference to the accompanying drawings, in which.

DESCRIPTION OF THE PREFERRED EMBDDIMENT

Figure 1:
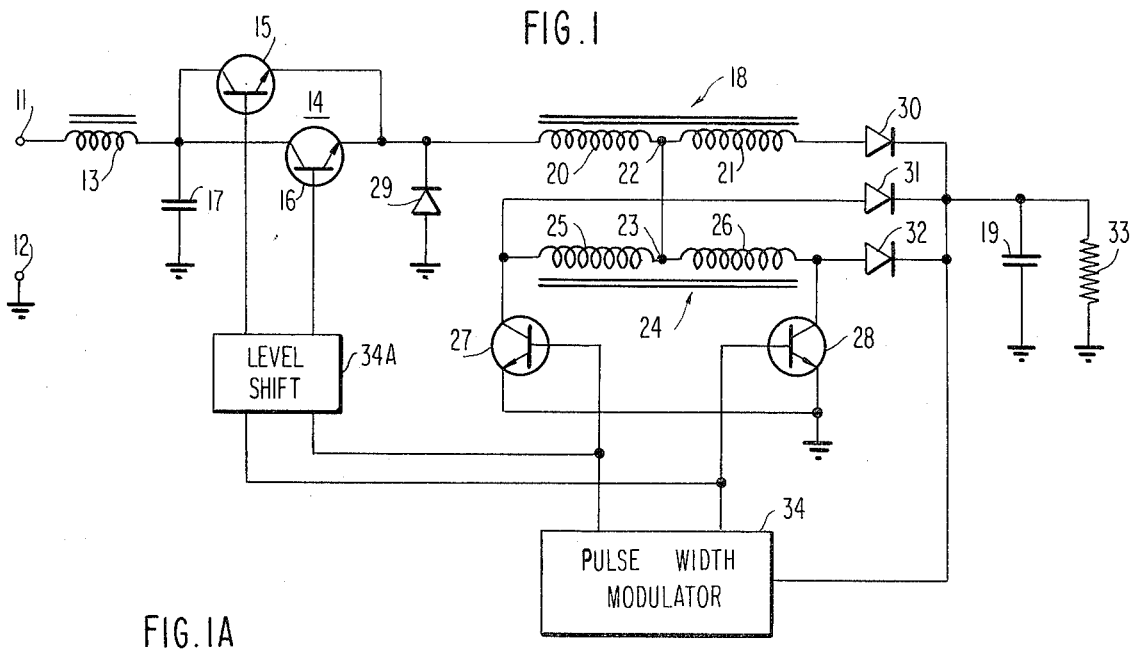
FIG. 1 is a simplified schematic and block diagram of the preferred embodiment of the invention.

With reference to FIG. 1, the input voltage is supplied across input terminals 11 and 12, terminal 12 being connected to ground. An iron core inductor 13 is connected in series between terminal 11 and a controlled switch 14 comprising parallel switching transistors 15 and 16. Actually, a single switching transistor would suffice provided that the base drive switching pulses provided to each of transistors 15 and 16 are provided to the single switching transistor. The junction of inductor 13 and switch 14 is connected to a capacitor 17, the other end of which is connected to ground. The inductor 13 and the capacitor 17 function as a low-pass LC input filter.

The energy storage elements of the converter are the iron core inductor 18 and the output capacitor 19. The inductor 18 is composed of two windings 20 and 21, winding 20 having a number of turns N1 and winding 21 having a number of turns N2. Windings 20 and 21 are connected to a common junction 22 which is connected to the center tap 23 of transformer winding 24. Transformer winding 24 is divided by center tap 23 into two halves 25 and 26, each of which has N1 turns. The ends of the transformer winding 24 are essentially connected to ground by NPN switching transistors 27 and 28 when one or the other is fully conducting.

Winding 20 of inductor 18 is connected to switch 14 and also to the cathode of power diode 29, the anode of which is connected to ground. Power diodes 30, 31 and 32 connect winding 21 of inductor 18 and either end of the transformer winding 24, respectively, to the output storage capacitor 19. A load represented by resistor 33 is connected across the storage capacitor 19. The output of the converter is connected to a pulse width modulator 34 which provides output switch control pulses to each of the switching transistors 15, 16, 27 and 28.

In order to describe the operation of the circuit shown in FIG. 1, the following assumptions are made: capacitor 19 is sufficiently large to maintain the output voltage constant during a complete cycle, inductor 18 is sufficiently large to maintain a net DC magnetic field, and inductor 18 is wound such that N2=N1. When switching transistors 16 and 27 conduct, diodes 29, 30 and 31 are reverse biased, and current flows through winding 20 of inductor 18 to the center tap 23 of transformer winding 24. The current then divides, half through transistor 27 to ground and half through diode 32 to the output capacitor 19 and load 33. Thus, the inductor current at this time is equal to twice the current going to capacitor 19 and load 33. When all switches are open, i.e., each of transistors 15, 16, 27 and 28 is non-conducting, diodes 29 and 30 become forward biased, and diodes 31 and 32 are reverse biased. The inductor 18 is clamped to ground by diode 29 and to the output by diode 30. The inductor current is equal to one-half the original inductor current, thus maintaining essentially the same magnitude of current to capacitor 19 and load 33. By providing essentially constant current to the capacitor and load, the output ripple current and voltage are inherently very low. The pulse width modulator 34 adjusts the duty cycle as required to maintain the output voltage. This circuit configuration will regulate the output voltage for an input ranging from one-half the output voltage to the voltage limits of switch 14 for a duty cycle capability of the pulse width modulator from 100 percent to zero. Assuming ideal switches and diodes, the output voltage for this configuration is given by the following expression:

$$E_o = \alpha 2 E_{in}$$

where $\alpha = t_{on}/T$, the duty cycle of the pulse width modulator.

Figure 1A:
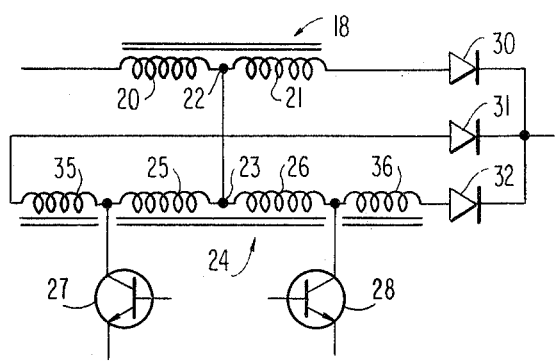
FIGS. 1a and 1b are each fragmentary schematic diagrams of modifications to the basic circuit shown in FIG. 1.

It is possible to extend the range to a lower input voltage or a higher output voltage by adding additional boost windings to the transformer. These windings are shown in FIG. 1A as winding 35 interposed between winding 25 and diode 31 and winding 36 interposed between winding 26 and diode 32. The combined turns of windings 25 and 35 is N2 and the combined turns of windings 26 and 36 is also N2. For minimum ripple current through the output capacitor 19, the N2/N1 turns ratio of inductor should be equal to the turns ratio N2/N1 of the transformer. As shown, the ratio N2/N1 is greater than 1; however, for applications requiring a minimum boost, the ratio N2/N1 can be less than one. The choice of the ratio N2/N1 will depend on the ratio of the output voltage to the minimum input voltage and the maximum duty cycle capability of the pulse width modulator. More specifically, the ratio is defined as follows:

$$N2/N1 \cong E_o/[\alpha E_{in}(\min)] - 1,$$

where $\alpha$ represents the maximum duty cycle capability of the pulse width modulator.

Figure 1B:
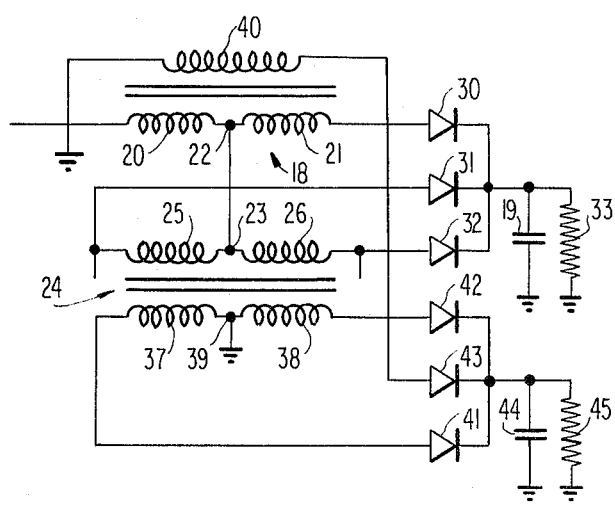

The output voltage on transformer winding 24 when either of the switching transistors 27 or 28 are conducting, is equal to $E_o$ plus one diode voltage drop. The voltage across inductor 18 when all switches are "off", i.e., each of transistors 15, 16, 27 and 28 are non-conducting, is equal to $E_o$ plus two diode voltage drops. As shown in FIG. 1B, adding secondary center tapped windings to the transformer amd secondary windings to the inductor and rectifying the currents will give regulated voltages for operating other circuitry that require either isolation or different voltage levels other than $E_o$. More specifically, and with reference to FIG. 1B, the transformer is provided with secondary windings 37 and 38 having a center tap 39 connected to ground. Inductor 18 is provided with a secondary winding 40 one end of which is connected to ground. Windings 37, 38 and 40 are connected by power diodes 41, 42 and 43 to output storage capacitor 44 and load 45. The secondary winding 40 of inductor 18 is phased for its high side to be positive when switching transistor 27 is non-conductive for a positive output. It will be appreciated that the secondary winding 40 of inductor 18 has the effect of filling in the gaps of the full wave rectifier comprising diodes 41 and 42 connected to the secondary of the transformer. While FIG. 1B illustrates only one secondary for each of the transformer and the inductor, a plurality of such secondary windings can be provided to supply as many auxiliary voltages as may be required.

Figure 2A:
FIGS. 2a, 2b and 2c are pulse waveforms illustrating the switching control pulses from the pulse width modulator when the input voltage is high.
Figure 2B:
Figure 2C:

The operation of the several modifications is the same. When the input voltage is high, the operation is that of a buck regulator, while when the input voltage is low, the operation is that of a boost regulator. With specific reference to FIGS. 2a, 2b and 2c, a high input voltage causes the switching pulse durations from the pulse width modulator 34 to be relatively short. FIG. 2a graphically represents the switching pulses to switching transistor 27, and FIG. 2b illustrates the switching pulses to switching transistor 28. FIG. 2c is simply a combination of FIGS. 2a and 2b and indicates the switching pulses to switch 14. In the embodiment shown in FIG. 1, switch 14 is composed of two switching transistors 15 and 16 connected in parallel and respectively receiving the switching pulses represented by FIGS. 2b and 2a.

The FIG. 1 circuit design requires that when switch 27 closes, switch 16 also closes and, alternatively, when switch 28 closes, switch 15 also closes. As shown, when either transistor switch 27 or 28 closes, the base of the closed switch will be clamped to ground plus the voltage drop across its base-emitter junction, or approximately 0.7. This is insufficient voltage to close switch 15 or 16. Accordingly, level shift circuitry 34a is provided to convert the pulses from the pulse width modulator to pulses furnishing sufficient drive to close switches 15 or 16.

Figure 3A:
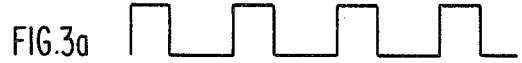
FIGS. 3a, 3b and 3c are pulse waveforms illustrating the switching control pulses from the pulse width modulator when the input voltage is low.
Figure 3B:
Figure 3C:

If switch 14 were merely composed of a single switching transistor, the two outputs of pulse width modulator 34 could be combined in an OR gate to produce the pulse waveform shown in FIG. 2c to that switching transistor. In contrast to the condition of high input voltage, FIGS. 3a, 3b and 3c illustrate the pulse waveforms from the pulse width modulator 34 when the input voltage is low. Under this condition, the pulse width durations are relatively long, switch 14 being open or turned off for very short periods of time. For conditions of very low input voltage, the duty cycle may approach or equal 100 percent. Under these conditions, the regulator is acting as a boost regulator.

Figure 4:
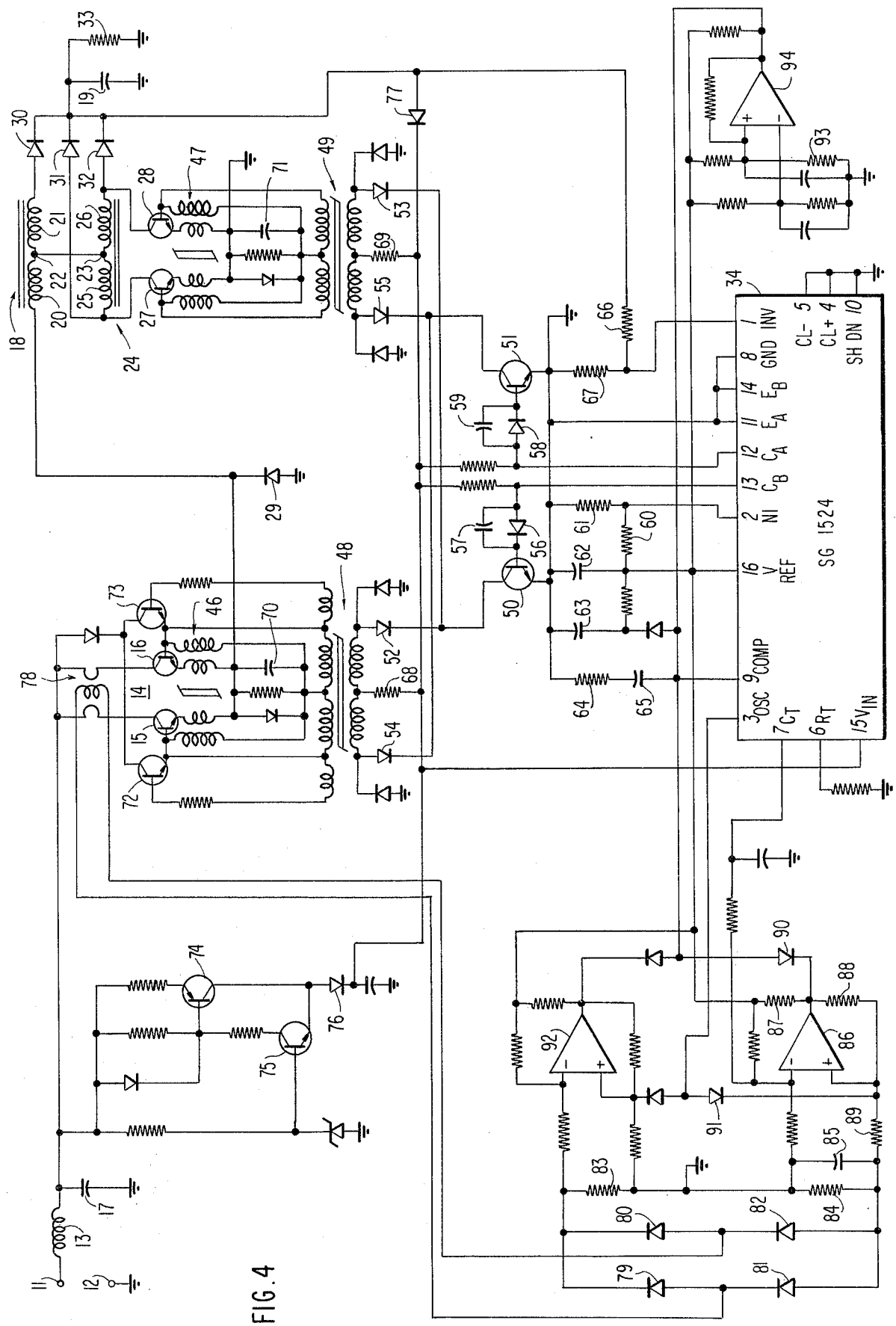
FIG. 4 is a detailed block and schematic diagram of the preferred embodiment of the invention.

FIG. 4 illustrates a concrete example of the implementation of the buck/boost regulator illustrated in FIG. 1. In FIGS. 1 and 4, like reference numerals designate identical or corresponding parts. In FIG. 4, transformers 46 and 47 connected in the base-emitter circuits of transistors 15, 16 and 27, 28, respectively, are current transformers to provide proportional current drive to the switching transistors. Transformers 48 and 49 connected to the base circuits of switching transistors 15, 16 and 27, 28, respectively, are drive transformers. Transistors 50 and 51 are inhibit transistors and are connected to the primaries of the drive transformers 48 and 49 by diodes 52, 53 and 54, 55, respectively. The pulse width modulator 34 is an integrated circuit type SG1524 manufactured by Silicon General and provides drive pulses to the bases of transistors 50 and 51. The pulse width modulator contains a voltage reference, an error amplifier, an oscillator, a pulse width modulator, a pulse steering flip-flop, dual alternating output switches, current limiting and shut down circuitry. The dual alternating output switches controlled by the pulse steering flip-flop have outputs at pins 12 and 13 of the integrated circuit which are connected to the base circuits of the inhibit transistors by means of parallel connected diode and capacitor combinations 56, 57 and 58, 59. The purpose of the diode and capacitor in each of the base circuits of inhibit transistors 50 and 51 is to provide back bias for positive turn off of the transistors when the drive signal from the pulse width modulator is removed. A precision voltage divider 60, 61 divides the internal voltage reference available at pin 16 by one-half and supplies pin 2 with the divided voltage. Capacitor 62 is a filter capacitor. Capacitor 63, on the other hand, provides a slow start turn-on when power is first applied. Resistor 64 and capacitor 65 connected in series between pin 9 and ground provide frequency compensation, and feedback from the output of the converter to the pulse width modulator is provided by another precision voltage divider 66, 67 to pin 1 of pulse width modulator 34.

A pulse width modulator signal from the pulse width modulator 34 on pins 12 of 13 turns off either of inhibit transistors 50 or 51 to provide drive to the switching transistors 15, 27 or 16, 28. When transistor 51 is turned off, drive to transistors 15 and 27 is provided by resistors 68 and 69 connected to the center taps of transformers 48 and 49, respectively. Current through the emitters of transistors 15 and 27 flows through the current transformers 46 and 47, respectively, providing additional base drive to transistors 15 and 27 directly proportional to their emitter currents. When transistor 51 turns on, the base drive to transistors 15 and 27 is shorted by transformers 48 and 49, rapidly removing the stored base charges of transistors 15 and 27 and thus terminating conduction. Capacitors 70 and 71 provide turn off bias to the switching transistors 15, 16 and 27, 28, respectively. When transistor 50 turns off, drive is provided to transistors 16 and 28, and the process repeats. Transistors 72 and 73 provide additional turn on drive to transistors 15 and 16 to accelerate saturation, especially at high input currents, for improved efficiency.

Transistors 74 and 75 and associated circuitry form a simple voltage regulator for the pulse width modulator 34. When input power is initially applied at terminals 11 and 12, this simple regulator provides power to the pulse width modulator 34 through diode 76 until the output voltage across capacitor 19 comes up, and then diode 77 provides voltage to the pulse width modulator from the output of the converter. If the output of the converter is shorted to ground, then power to the pulse width modulator is again provided by the simple regulator comprising the transistors 74 and 75.

The circuit shown in FIG. 4 incorporates both input and output current limiting. Switching current is sensed by current sensing transformer 78 in the collector circuits of transistors 15 and 16. A one turn winding to each collector comprises the primary of transformer 78. The secondary current is rectified by a bridge circuit comprising diodes 79, 80, 81 and 82, and the rectified current flows through resistors 83 and 84. The junction of resistors 83 and 84 is referenced to ground. The voltage across resistor 84 is averaged by capacitor 85 to represent the average input current. The voltage across resistor 83 is not averaged, and the peak value is directly related to the output current. Both the input current sensing and output current sensing are accomplished by transformer 78.

Operational amplifier 86 and associated components compose the input current limit control circuitry. A portion for the reference voltage from pin 16 of pulse width modulator 34 is applied to the inverting input of amplifier 86 to provide a fixed positive bias. The positive reference voltage is also applied to the non-inverting input through resistor 87 and 88. This voltage is summed with the negative voltage developed across resistor 84 and averaged by capacitor 85 and supplied by resistor 89 to the non-inverting input of amplifier 86. When the summation of the reference voltage and the negative voltage of capacitor 85 is less than the fixed positive bias to the inverting input of amplifier 86, amplifier 86 switches state causing the output to go to zero volts. This causes diode 90 to conduct, pulling pin 9 of pulse width modulator 34 to ground and thus terminating switching transistor drives for the balance of the cycle. An oscillator pulse from pin 3 of pulse width modular 34 supplied through diode 91 to the non-inverting input of amplifier 86 resets the amplifier to again sample the input current for the next cycle. Thus, the circuit has a one cycle response.

Operational amplifier 92 and associated circuitry compose the output current limiting circuitry. This circuitry senses the input current pulses appearing across resistor 83 and operates in the same manner as the input current sensing circuit just described except that the voltage across resistor 83 is not averaged.

In the event of a shorted load, the output current from the converter will be relatively high resulting in increasing temperatures. Excessive temperature could cause a catastrophic failure, and to protect against over temperature, a temperature limit is incorporated in the circuit shown in FIG. 4. This circuit utilizes a thermister 93 in a conventional bridge configuration and a comparator 94 with hysteresis. The thermister is mounted on the heat sink of transistor switches 15 and 16, and when the temperature limit is reached, the comparator 94 switches to inhibit the pulse width modulator 34. At a temperature less than the temperature limit, the pulse width modulator is again re-enabled. This process continues until the shorted load is removed or the particular load fuse is blown.

Both the current limiting and temperature limiting features of the specific circuit shown in FIG. 4 are optional safety features. They are described and illustrated only for the sake of completeness and not necessary to the operation of the claimed invention. These circuits are, however, useful in a practical implementation of the invention.

The buck/boost regulator according to the invention has many advantages. The tapped inductor 18 combined with the boost transformer 24, in a steady-state condition, maintains essentially constant output current, minimizing AC ripple current to the output capacitor 19. The buck and boost switches 14 and 27, 28 are controlled from a single pulse width modulator 34 to provide voltage regulation over a wide range of input voltages. Overlap of conduction of the boost switches 27, 28, will not cause a catastrophic failure as in many conventional boost circuits because inductor 18 limits the current. Adding additional windings to inductor 18 and transformer 24 as illustrated in FIG. 1b, will provide other auxiliary voltages. With the circuit according to the invention, it is possible to maintain the output voltage at a level greater than, equal to or less than the input voltage. Reliability is greatly enhanced since the maximum voltage swing of switch 14 is equal to the input voltage, while the maximum voltage of switching transistors 27 and 28 is equal to the output voltage. The buck/boost regulator according to the invention is ideal for space applications where the primary power source may be a solar array, fuel cell or thermonic generator exhibiting wide ranges of input voltages.

While the invention has been described in terms of a specific preferred embodiment, those skilled in the art will recognize that variations and modifications can be made in the practice of the invention within the scope of the appended claims.

What is claimed is:

1. A voltage regulated DC to DC converter operable over a wide range of input voltage including voltages greater or less than the desired output voltage comprising:

an inductor comprising two windings having a number of turns N1 and N2, respectively, one end of each winding being connected to a common junction, a transformer having first and second windings each having a number of turns N1 and one end connected to a center tap, said center tap being connected to said common junction, a storage capacitor connected between the output of said converter and ground, a first diode connected between the inductor winding having N2 turns and said storage capacitor, a second diode connected between said first transformer winding and said storage capacitor, a third diode connected between said second transformer winding and said storage capacitor, a fourth diode connected between the inductor winding having N1 turns and ground, first switch means connected between a source of said input voltage and the junction between said inductor and said fourth diode, second switch means connected between said first transformer winding and ground, third switch means connected between said second transformer winding and ground, and pulse width modulating means connected to said output of said converter and to each of said first, second, and third switch means for alternately closing and then opening said second and third switch means and closing said first switch means each time either of said second or third switch means are closed, the duty cycle of the closing and opening of the said switch means being adjusted by said pulse width modulator to regulate said output voltage.

2. A voltage regulated DC to DC converter as recited in claim 1 wherein said transformer additionally comprises third and fourth windings, said third winding being interposed between said first winding and said second diode, and said fourth winding being interposed between said second winding and said third diode.

3. A voltage regulated DC to DC converter as recited in claim 2 wherein the combined number of turns of said first and third transformer windings and said second and fourth transformer windings are each N2, the turns ratio N2/N1 of said inductor being equal to the turns ratio N2/N1 of said transformer.

4. A voltage regulated DC to DC converter as recited in claim 1 further comprising:

at least one secondary winding coupled to said inductor, at least one center tapped secondary winding coupled to said transformer, a second storage capacitor connected between an auxiliary output of said converter and ground, a fifth diode connected between the secondary winding of said inductor and said second storage capacitor, and fifth and sixth diodes connected between either end of said center tapped secondary winding of said transformer and said second storage capacitor.

5. A voltage regulated DC to DC converter as recited in claim 1 wherein N1 equals N2 with respect to said inductor.

6. A voltage regulated DC to DC converter operable over a wide range of input voltages comprising:

means to receive input voltages greater to or less than a desired output voltage;

output means;

energy storage means connected to both said receiving means and said output means;

first switch means between said receiving means and said energy storage means for controlling said energy storage means;

single regulator means, including second switch means, connected between said output means and said first switch means for sensing voltage at said output means and controlling said first switch means in response thereto;

said first switch means operating at a voltage essentially no greater than the input voltages; and said second switch means operating at a voltage essentially no greater than the voltage at said output means.

7. The converter of claim 6 wherein said energy storage means is an inductor connected between said first switch means and said output means and a capacitor connected across said output means.

8. The converter of claim 6 wherein said single regulator means is a pulse width modulator.

* * * * *